(12) United States Patent
Villmark

(10) Patent No.: US 10,297,990 B2
(45) Date of Patent: May 21, 2019

(54) SUBSEA SPLICE TERMINATION UNIT

(71) Applicant: Siemens Aktiengesellschaft, Munich (DE)

(72) Inventor: Trond Holger Villmark, Kongsberg (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/062,182

(22) PCT Filed: Jun. 9, 2016

(86) PCT No.: PCT/EP2016/063146
§ 371 (c)(1),
(2) Date: Jun. 14, 2018

(87) PCT Pub. No.: WO2017/108210
PCT Pub. Date: Jun. 29, 2017

(65) Prior Publication Data
US 2018/0375305 A1 Dec. 27, 2018

(30) Foreign Application Priority Data
Dec. 22, 2015 (EP) .................................... 15202016

(51) Int. Cl.
*G02B 6/44* (2006.01)
*H02G 1/10* (2006.01)
*H02G 9/02* (2006.01)

(52) U.S. Cl.
CPC ............. *H02G 1/10* (2013.01); *G02B 6/4428* (2013.01); *H02G 9/02* (2013.01); *G02B 6/4471* (2013.01)

(58) Field of Classification Search
None
See application file for complete search history.

(56) References Cited

U.S. PATENT DOCUMENTS 5,684,911 A 11/1997 Burgett

FOREIGN PATENT DOCUMENTS

| EP | 0247791 A2 | 12/1987 |
| EP | 2711597 A1 | 3/2014 |
| WO | WO 9815864 A1 | 4/1998 |

OTHER PUBLICATIONS

PCT International Search Report and Written Opinion of International Searching Authority dated Sep. 28, 2016 corresponding to PCT International Application No. PCT/EP2016/063146 filed Sep. 6, 2016.

*Primary Examiner* — Jerry Rahll
(74) *Attorney, Agent, or Firm* — Harness, Dickey & Pierce, P.L.C.

(57) ABSTRACT

A subsea splice termination unit for terminating and splicing two fiber optic cables, in particular of an umbilical, is provided. The subsea splice termination unit is configured for deployment in an underwater environment. The subsea splice termination unit includes a subsea enclosure, a first termination assembly for terminating a first fiber optic cable at the subsea splice termination unit, a second termination assembly for terminating a second fiber optic cable at the subsea splice termination unit, a chamber inside the subsea enclosure, a first penetrator leading at least a first optical fiber of the first fiber optic cable into the chamber, and a second penetrator leading at least a second optical fiber of the second fiber optic cable into the chamber. A splice between the first optical fiber and the second optical fiber is arranged in the chamber.

30 Claims, 5 Drawing Sheets

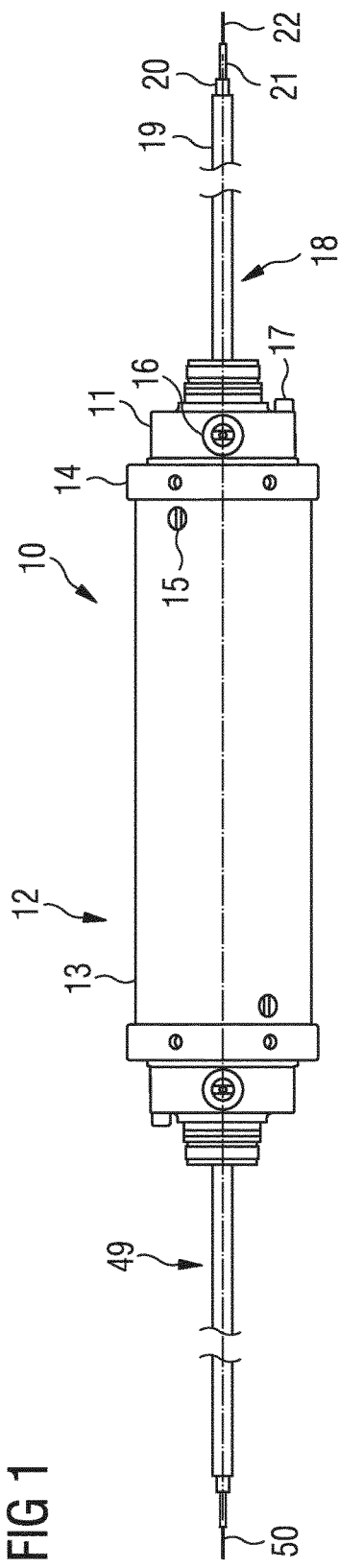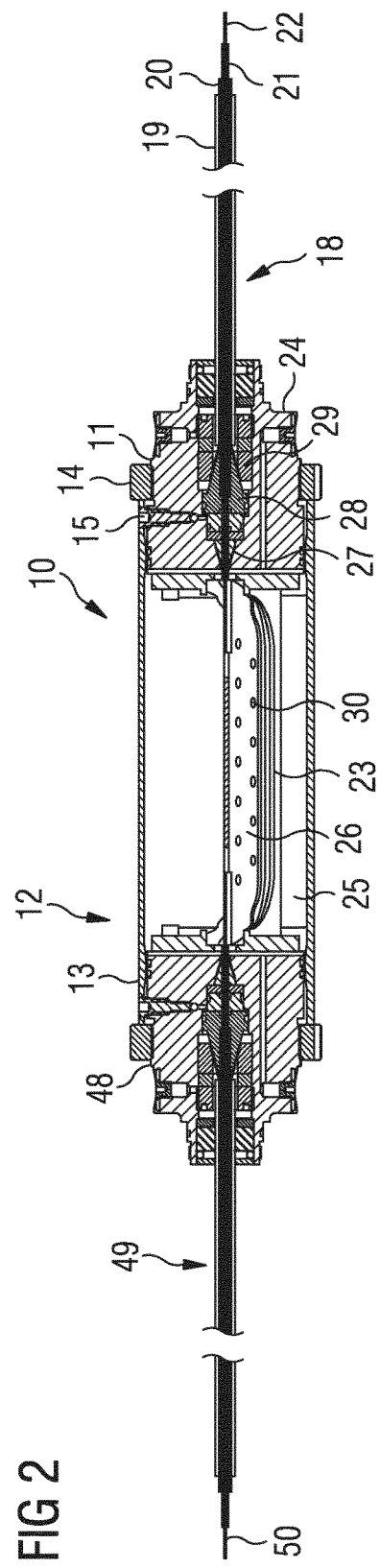

SUBSEA SPLICE TERMINATION UNIT

PRIORITY STATEMENT

This application is the national phase under 35 U.S.C. § 371 of PCT International Application No. PCT/EP2016/063146 which has an International filing date of Jun. 9, 2016, which designated the United States of America and which claims priority to European patent application number EP 15202016.0 filed Dec. 22, 2015, the entire contents of which are hereby incorporated herein by reference.

FIELD OF THE INVENTION

At least one embodiment of the invention generally relates to a Splice Termination Unit and/or to a respective method.

BACKGROUND

When deploying an umbilical subsea, there are several sections that have to be spliced together. The main umbilical (static umbilical) comes in sections and has to be spliced into one length together, and the static umbilical has to be spliced together with the dynamic umbilical. All this splicing has to be done on a ship while the umbilical is deployed. Today, a normal splice operation is about 12 hours for each splice. A normal operation for deploying an umbilical will have more than 4 splices, depending on the length of the umbilical. The operation is also dependent on the weather. In heavy seas, the operator sometimes has to abort the operation and cut the umbilical for safety issues. The most important issue for the process in laying down an umbilical is the time the ship has to wait for splicing the umbilical sections together. Also, it is desirable to keep the physical size of a splicing box as small as possible.

Up to now this time consuming splice work has not been possible to speed up.

SUMMARY

The inventor recognizes that there is a need to improve the splicing of subsea cables, in particular umbilical.

This need is met by the features of the embodiments. The claims describe embodiments of the invention.

By embodiments of the invention, very short installation times for splices, in particular umbilical splices, can be achieved. Further, the splice unit has a compact design and is capable of withstanding rough handling and operational environment.

With the splice unit according to embodiments of the invention, it may be possible to provide a splice in nominally 2 hours work, which means nominally 10 hours saved. This can result in significant time and cost savings.

In particular, according to an embodiment of the present invention, a subsea splice termination unit for terminating and splicing two fiber optic cables, in particular of an umbilical, is provided. The subsea splice termination unit is configured for deployment in an underwater environment. The subsea splice termination unit comprises a subsea enclosure, a first termination assembly for terminating a first fiber optic cable at the subsea splice termination unit, a second termination assembly for terminating a second fiber optic cable at the subsea splice termination unit, and chamber inside the subsea enclosure. A first penetrator of the subsea splice termination unit leads at least a first optical fiber of the first fiber optic cable into the chamber, and a second penetrator of the subsea splice termination unit leads at least a second optical fiber of the second fiber optic cable into the chamber. A splice between the first optical fiber and the second optical fiber is arranged in the chamber.

According to another embodiment of the present invention, a method for terminating and splicing a first fiber optic cable to a second fiber optic cable for allowing deployment of the splice in an underwater environment is provided. According to the method, the first fiber optic cable is terminated to a subsea splice termination unit and an optical fiber of the first fiber optic cable is led into a chamber of the subsea splice termination unit. The second fiber optic cable is terminated to the subsea splice termination unit and an optical fiber of the second fiber optic cable is led into the chamber of the subsea splice termination unit. The first and second optical fibers are spliced and the fiber splice is arranged in the chamber. The chamber is sealed with a subsea enclosure of the subsea splice termination unit.

BRIEF DESCRIPTION OF THE DRAWINGS

FIG. 1 is a schematic side view of a splice termination unit according to an embodiment.

FIG. 2 is a schematic sectional view of a splice termination unit according to an embodiment.

DETAILED DESCRIPTION OF EXAMPLE EMBODIMENTS

Figure 3:
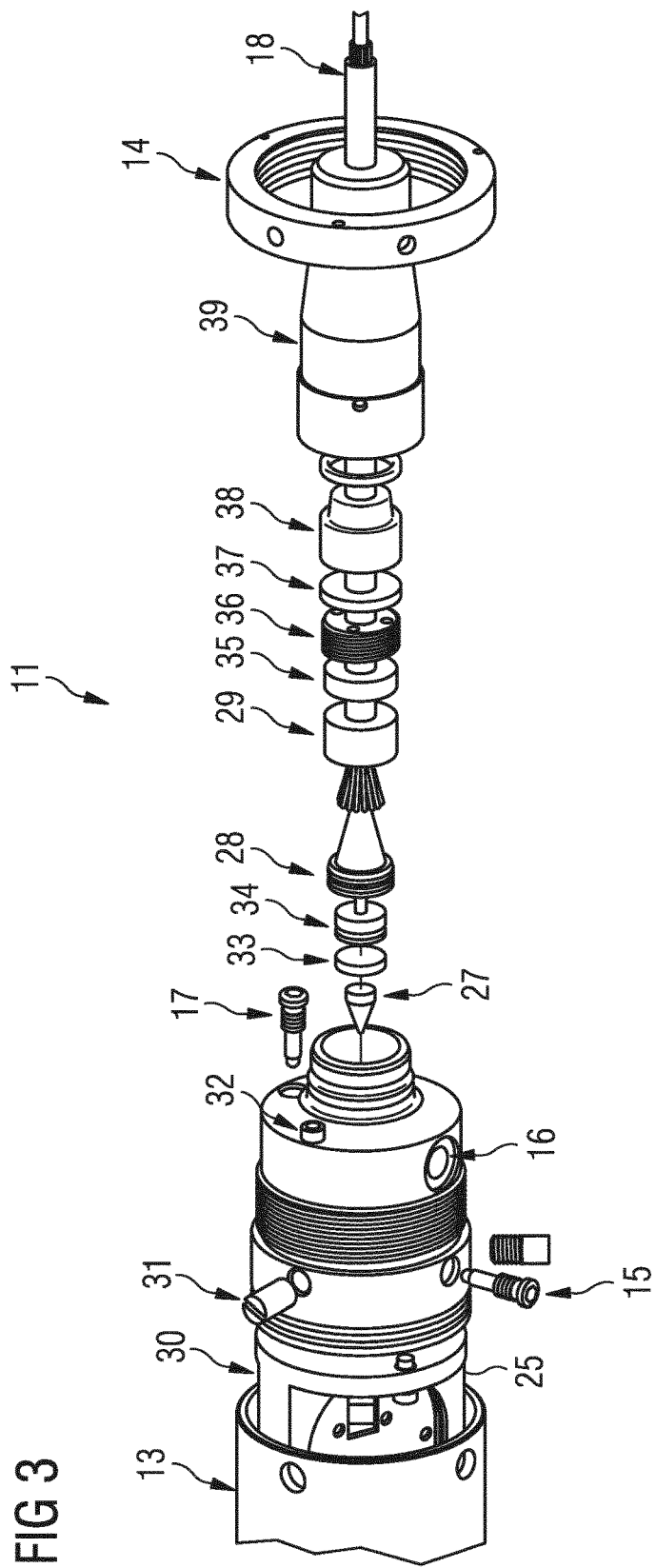
FIG. 3 is a schematic exploded view showing details of a termination assembly of a splice termination unit according to an embodiment.

In particular, according to an embodiment of the present invention, a subsea splice termination unit for terminating and splicing two fiber optic cables, in particular of an umbilical, is provided. The subsea splice termination unit is configured for deployment in an underwater environment. The subsea splice termination unit comprises a subsea enclosure, a first termination assembly for terminating a first fiber optic cable at the subsea splice termination unit, a second termination assembly for terminating a second fiber optic cable at the subsea splice termination unit, and chamber inside the subsea enclosure. A first penetrator of the subsea splice termination unit leads at least a first optical fiber of the first fiber optic cable into the chamber, and a second penetrator of the subsea splice termination unit leads at least a second optical fiber of the second fiber optic cable into the chamber. A splice between the first optical fiber and the second optical fiber is arranged in the chamber.

Fiber optic cables used for example as an umbilical for communicating data between subsea equipment and land-based or vessel-based equipment, may comprise the following structure. One or more optical fibers are arranged within a tube. The tube may be made of a metal material, for example stainless steel. The tube may be pressure resistant such that an internal pressure inside the tube may be in the range of 1 atm even if an outside ambient pressure may be in a range of up to 300 bars or even more. The tube, which will be called in the following also fiber tube, may be jacketed by an inner jacket which may be surrounded by a cable armor, for example a solid armor tube or several armor wires forming a tube. The cable armor may be made for example of stainless steel. The cable armor may be jacketed by an outer jacket, for example a thermal insulation. The inside of the cable armor may be filled with a fluid, for example oil, and may be pressure compensated such that a pressure inside the cable armor corresponds essentially to a pressure prevailing outside the cable armor and outer jacket.

By terminating the first and second fiber optic cables at the corresponding first and second terminal assemblies, pressure compensated areas, in particular the interior of the cable armor, may be terminated separately from non-pressure compensated areas, in particular the fiber tube and the fiber itself. The fiber tube and the fiber may be led by the first and second penetrators into the chamber, in which the fiber tube may be terminated and the first and second optical fibers may be connected by a splice.

According to an embodiment, the first fiber optic cable is part of a first section of a subsea umbilical. Likewise, the second fiber optic cable is part of a second section of the subsea umbilical. The subsea splice termination unit is a subsea umbilical splice termination unit that forms part of an umbilical splice between the first and second umbilical sections. For connecting a subsea device with another subsea device, a land-based device or a device on a ship or vessel, an umbilical of considerable length, for example more than some kilometers, or even more than some 100 km, or thousand kilometers, may be needed. Such an umbilical may be composed of a plurality of fiber optic cable sections which have to be connected together. Due to its structure, the above defined subsea splice termination unit may be used to connect the fiber optic cable sections easily and in short time, for example on a ship or vessel.

According to another embodiment, the subsea splice termination unit comprises a fiber management unit disposed inside the chamber. In case a plurality of fibers are contained within the first fiber optic cable, this plurality of fibers may be spliced with corresponding fibers of the second fiber optic cable, and the fibers as well as the splices may be securely arranged in the fiber management unit.

According to an embodiment, the first optical fiber is embedded in a corresponding first fiber tube and the second optical fiber is embedded in a corresponding second fiber tube. The first penetrator comprises a corresponding first sealing body providing a through hole through which the corresponding first fiber tube is extending. The second penetrator comprises a corresponding second sealing body providing a through hole through which the corresponding second fiber tube is extending. Within the through hole of the first sealing body at least one sealing is arranged and provides a fluid tight sealing of the first fiber tube within the first sealing body. Likewise, at least one seal is arranged within the through hole of the second sealing body and provides a fluid tight sealing of the second fiber tube with in the second sealing body. By sealing the fiber tube with the seal against the sealing body, a fluid tight connection may be provided without any molding such that the connection between the first and second fiber optic cables may be established in short time. In particular, it may be possible to provide a connection between the two fiber-optic cables including the splice in nominally two hours work, which means nominally 10 hours saved. This can result in significant time and cost savings.

According to a further embodiment, the subsea splice termination unit comprises a seal at an outer circumferential surface of the corresponding sealing body, which provides a fluid tight sealing of the corresponding sealing body with the corresponding termination assembly. In detail, a seal is arranged at an outer circumferential surface of the first sealing body and provides a fluid tight sealing of the first sealing body within the first termination assembly. Likewise, a seal is provided at an outer circumferential surface of the second sealing body and provides a fluid tight sealing of the second sealing body within the second termination assembly. For example, the fiber tube may be inserted through a through hole of the sealing body and sealed within the sealing body, and the sealing body including the optical fiber may be inserted into a bore or opening of the corresponding termination assembly and may be sealed within the opening by the seal. This may ease the assembly of the fiber optic cable within the subsea splice termination unit.

The subsea enclosure may be configured to maintain a predetermined pressure inside the chamber. For example, the pressure inside the chamber may be maintained at a value below 10 bar, in particular below five bar and furthermore in particular at a value between one and two bar. In particular during installation of the fiber optic cables, for example as parts of a subsea umbilical, one end of the fiber-optic cable is arranged on board of a vessel whereas the other end is already several hundred meters or several thousand meters below the surface. Therefore, the interior of the fiber tube is not pressure compensated, but may have a pressure in a range of for example one to two bar. Therefore, the inside of the chamber which is in contact with the interior of the fiber tube is advantageously also not pressure compensated, but maintains a predetermined pressure in the range of one to two bar.

The chamber may be filled with gas, for example with nitrogen or helium. The gas may avoid condensation of water inside the chamber.

As an alternative, the chamber may be a pressure compensated chamber. The internal pressure of the pressure compensated chamber may be balanced to a pressure prevailing in the ambient environment, for example in the subsea environment when installed subsea. In this case, the first and/or second termination assembly may comprise a fiber optic penetrator for leading an optical fiber of the respective fiber optic cable into the chamber. The fiber optic penetrator may provide sealing of the chamber. The fiber optic penetrator may preferably comprise a glass to glass seal for sealing against the optical fiber. The subsea enclosure may be configured to allow deployment of the subsea splice termination unit in water depth of at least 2000 m, preferably at least 3000 m. For example, the enclosure may be filled with a fluid, for example an oil, and may comprise a pressure compensator for balancing the internal pressure to the pressure prevailing in an environment.

According to an embodiment, the subsea enclosure comprises a cylindrical housing with two lids. A first end lid comprises the first termination assembly and a second end lid comprises the second termination assembly. Thus, the housing may be opened from both sides for assembling the fiber splice and the two fiber optic cables at the splice termination unit.

According to a further embodiment, the subsea enclosure comprises at least a fill port and/or a vent port for filling the chamber with a medium. The medium may comprise for example nitrogen or helium. Providing the fill port enables flushing of the subsea enclosure with nitrogen or helium.

According to another embodiment, the first termination assembly comprises a retaining element for securing a cable armor of the first fiber optic cable to the subsea splice termination unit. The second termination assembly comprises a retaining element for securing a cable armor of the second fiber optic cable to the subsea splice termination unit. Each retaining element comprises for example a cone and a sleeve with an inner tapered surface configured to receive the cone. The cable armor is clamped between the inner surface of the sleeve and an outer surface of the cone. Thus, a reliable connection guaranteeing tensile strength may be provided.

According to a further embodiment, the first termination assembly comprises an armor grounding element for providing an electrical connection to a cable armor of the first fiber optic cable. The second termination assembly comprises an armor grounding element for providing an electrical connection to a cable armor of the second fiber optic cable. The armor grounding element may be provided by a metal sleeve, for example the above-described sleeve which cooperates with the cone for fixing the corresponding fiber-optic cable to the subsea splice termination unit. The metal sleeve may be made of copper. The cable armor passes through the metal sleeve. In particular, in connection with subsea umbilical is, the fiber optic cables may be provided with a direct electrical heating (DEH) system. The direct electrical heating system uses a single phase electrical current to heat the pipeline content above the hydrate formation temperature. The supply current for the direct electric heating may be provided through the cable armor. When coupling two fiber optic cables, an electrical connection between the two cable armors has to be provided. A low resistive connection to the housing may be provided via the metal sleeve, in particular the copper sleeve.

As described above, the first optical fiber may be embedded in a corresponding first fiber tube. Likewise, the second optical fiber may be embedded in a corresponding second fiber tube. The cone of the first termination assembly may provide a through hole through which the first fiber tube is extending. At least one seal is arranged within the through hole and provides a fluid tight sealing of the first fiber tube within the cone. The cone of the second termination assembly may provide a through hole through which the second fiber tube is extending. At least one seal is arranged within the through hole and provides a fluid tight sealing of the second fiber tube within the cone. Thus, a reliable and fluid tight connection having tensile strength may be provided for the fiber tubes.

Furthermore, the first and/or second termination assembly may comprise a fiber tube grounding element providing an electrical connection to a metallic fiber tube of the respective fiber optic cable. The metallic fiber tube encloses the respective optical fiber and the fiber tube grounding element may be provided by a metal cone, in particular a copper the cone. A current for the direct electric heating system may additionally be transmitted via the metallic fiber tube of the fiber optic cables. Therefore, the copper cone may provide a low resistive electrical connection between the metallic fiber tubes of the connected fiber-optic cables via the subsea splice termination unit.

According to another embodiment, the first and/or second termination assembly comprises at least two seals, for example O-ring seals. The first and/or second termination assembly may furthermore comprise a test port that is in flow communication with a space between these two seals for testing the integrity of at least one of the seals.

According to a further embodiment, the subsea enclosure comprises a cylindrical housing having an insert. The insert has a section that provides the chamber. The first and second termination assemblies are provided at opposing ends of the insert. The cylindrical housing is a cylindrical sleeve that can be slid in an axial direction into sealing engagement with the insert. This enables a reliable and easily manageable assembly of the subsea splice termination unit with both fiber optic cables being connected to the first and second termination assemblies and the splice arranged in the chamber.

According to another embodiment of the present invention, a method for terminating and splicing a first fiber optic cable to a second fiber optic cable for allowing deployment of the splice in an underwater environment is provided. According to the method, the first fiber optic cable is terminated to a subsea splice termination unit and an optical fiber of the first fiber optic cable is led into a chamber of the subsea splice termination unit. The second fiber optic cable is terminated to the subsea splice termination unit and an optical fiber of the second fiber optic cable is led into the chamber of the subsea splice termination unit. The first and second optical fibers are spliced and the fiber splice is arranged in the chamber. The chamber is sealed with a subsea enclosure of the subsea splice termination unit.

For conducting the above-described method steps, the above-described subsea splice termination unit may be used and therefore, the above-described method comprises also the advantages of the above described subsea splice termination unit.

According to an embodiment, the chamber may be filled with gas, for example nitrogen or helium, through a fill port provided in the subsea enclosure of the subsea splice termination unit. Furthermore, for sealing the chamber, a cylindrical housing of the subsea enclosure is slid over and into sealing engagement with an insert of the subsea splice termination unit.

The method for connecting two fiber optic cables as described above may be executed in nominally two hours work, which means that the above-described method may be executed much faster than traditional splicing technologies which needed up to 12 hours.

It is to be understood that the features and embodiments described above may be used not only in the respective combinations indicated, but also in other combinations or in isolation without leaving the scope of the present invention.

In the following, example embodiments of the invention will be described in more detail. It is to be understood that the features of the various example embodiments described herein may be combined with each other unless specifically noted otherwise. Same reference signs in the various drawings and the following description refer to similar or identical components.

The following detailed description is given with reference to a splice termination unit in form of an umbilical splice termination unit (abbreviated umbilical splice termination), which has termination assemblies that are termed herein advanced fiber terminations (AFT). It should be clear that the teachings of the present application also apply to different uses of the splice termination unit, for example between subsea cables not forming part of an umbilical, and to different configurations, for example other configurations of the termination assemblies.

FIGS. 1 and 2 show schematically an embodiment of a splice termination unit 10 in form of an AFT umbilical splice termination.

The splice termination unit 10 comprises a subsea enclosure 12, a first termination assembly 11 and a second termination assembly 48. The subsea enclosure 12 comprises a cylindrical housing 13, at which the first and second termination assemblies 11, 48 are mounted. The first termination assembly 11 is mounted at a first side of the cylindrical housing 13, and the second termination assembly 48 is mounted at a second side of the cylindrical housing 13. A first fiber optic cable 18 is terminated at the first termination assembly 11, and a second fiber optic cable 49 is terminated at the second termination assembly 48. The first and second fiber optic cables 18, 49 form sections of a subsea umbilical. The first fiber optic cable 18 comprises a first optical fiber 22 which is spliced within the subsea enclosure 12 to a second optical fiber 50 of the second fiber optic cable 49. The first and second termination assemblies 11, 48 are essentially constructed in the same way. Therefore, in the following, only the first termination assembly 11 in connection with the first fiber optic cable 18 will be described in more detail. However, this description applies likewise to the second termination assembly 48 in connection with the second fiber-optic cable 49.

The fiber-optic cable 18 comprises a fiber tube 21 in which the optical fiber 22 is arranged. Although only one optical fiber 22 is shown in FIGS. 1 and 2, a plurality of optical fibers may be arranged within the fiber tube 21. The fiber tube 21 may be made of a metal material, for example stainless steel. The fiber tube 21 may be pressure resistant such that an internal pressure inside the fiber tube 21 is independent from an ambient pressure outside the fiber tube 21. The fiber tube 21 is surrounded by a cable armor 20. A space between the fiber tube 21 and the cable armor 20 may be filled with oil and may be pressure compensated such that a pressure in the space between the fiber tube 21 and the cable armor 20 corresponds essentially to the pressure prevailing outside the fiber-optic cable 18. The cable armor 20 is surrounded by a thermal insulation 19.

Figure 4:
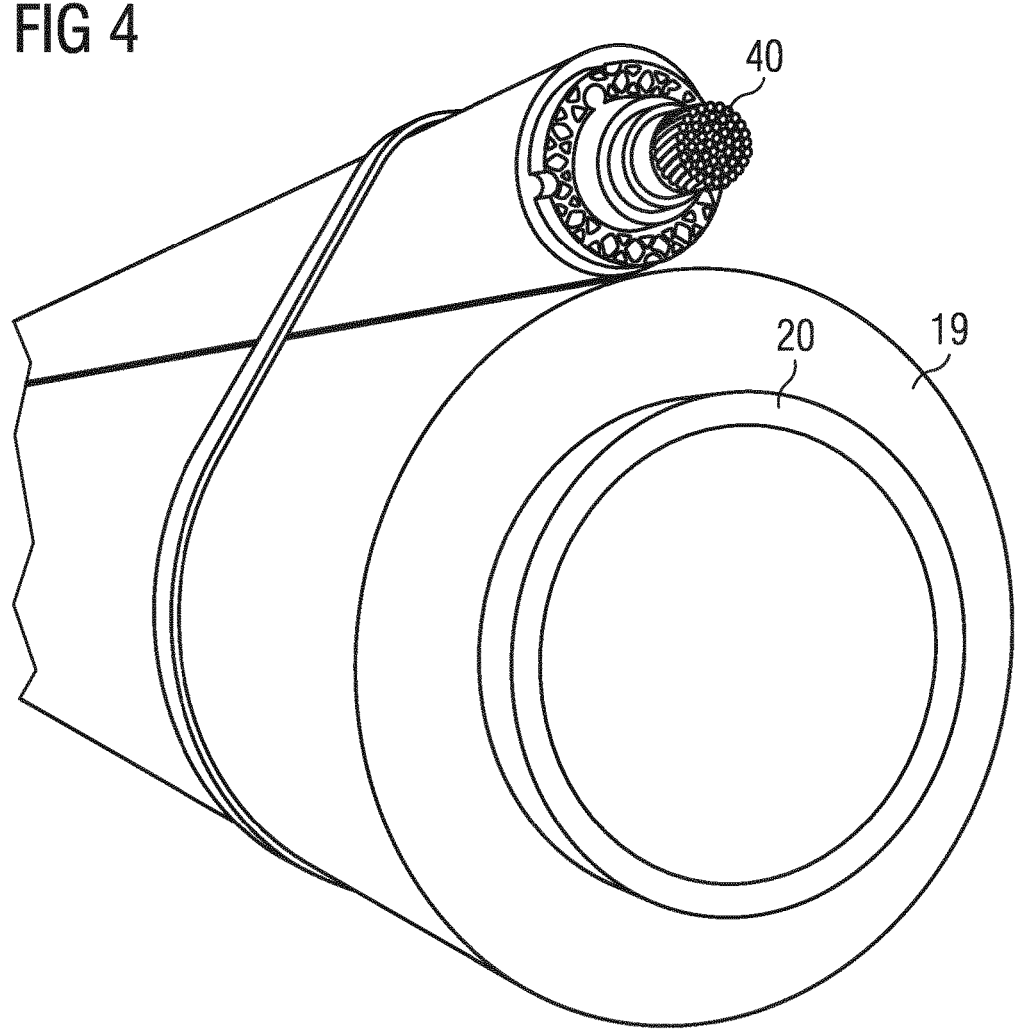
FIG. 4 is a schematic drawing showing a direct electrical heating cable mounted to a pipeline on which a splice termination unit according to an embodiment may be used.

FIG. 4 shows the cable armor 20 and the thermal insulation 19 in connection with a direct electrical heating cable 40.

The subsea enclosure 12 comprises a locknut 14 for mounting the first termination assembly 11 to the cylindrical housing 13. Furthermore, the cylindrical housing 13 comprises an umbilical seal test port 15 for monitoring a sealing between the first termination assembly 11 and the cylindrical housing 13.

At the first termination assembly 11, a vent port 16 and a fill port 17 are provided. The fill port 17 is in communication with an interior of the cylindrical housing 13. For example, the interior of the cylindrical housing 13 may be filled via the fill port 17 with gas, for example nitrogen. The vent port 16 is in communication with the interior of the cable armor 20, when the fiber optic cable 18 is mounted at the first termination assembly 11. Via the vent port 16, the cable armor 20 may be ventilated after mounting it at the first termination assembly 11.

FIG. 2 shows a sectional view of the splice termination unit 10 of FIG. 1. The termination assembly 11 terminates the thermal insulation 19, the cable armor 20, and the fiber tube 21. For terminating the cable armor 20, an armor termination cone 28 and an armor grounding element 29 are provided. The cable armor 20, which may comprise a solid armor tube or several armor wires forming a tube, is clamped between the armor termination cone 28 and the armor grounding element 29 such that a reliable and low resistive electrical contact between the cable armor 20 and the armor termination cone 28 and the armor grounding element 29 is provided. Therefore, the armor termination cone 28 and the armor grounding element 29 may be made of copper.

For terminating the fiber tube 21, a tube grounding element 27 is provided, through which the fiber tube is extending with close fit such that an electrical contact between the fiber tube 21 and the tube grounding element 27 is provided. The tube grounding element 27 may also be made of copper for providing low electrical resistance. After terminating the fiber tube 21, the optical fiber 22 is exposed and extends into a chamber 26 of the cylindrical housing 13.

An insert 25 inside the chamber 26 of the cylindrical housing 13 comprises a fiber optic management unit 30 which guides the fibers 22 and 50. The fibers 22 and 50 are connected via a fiber splice 23.

Termination of the fiber optic cable 18 within the termination assembly 11 will be described in the following in more detail with respect to FIGS. 3 and 6.

The fiber optic cable 18 is extending through a bend restrictor 39, a seal element 38, and a washer 37 and a nut 36. The fiber tube 21 is extending through the armor termination cone 28, whereas the cable armor 20 surrounds at least partially the armor termination cone 28. In cooperation with the armor grounding element 29 the cable armor 20 is clamped between an outer surface of the armor termination cone 28 and an inner surface of the tube grounding element 27. A pressing force for clamping the cable armor 20 between the armor termination cone 28 and the armor grounding element is provided from the nut 36 via a low friction washer (gland seal) 35. The armor grounding element 29 and the armor termination cone 28 are in contact with a metal body of the termination assembly 11 such that a low resistive and reliable electrical connection between the termination assembly 11 and the cable armor 20 is provided.

At an outer circumferential surface of the armor termination cone 28, an O-ring seal 45 is provided for establishing a sealing between the armor termination cone 28 and the body of the termination assembly 11. At an inner circumferential surface of the through hole of the armor termination cone 28, through which the fiber tube 21 is extending, a further O-ring seal 47 is provided for establishing a sealing between the armor termination cone 28 and the fiber tube 21.

Next, the fiber tube 21 is extending through a sealing body 34 which comprises at its outer circumferential surface an O-ring seal 44 and at its inner circumferential surface an O-ring seal 46. The O-ring seal 44 provides a sealing between the sealing body 34 and the body of the termination assembly 11. The O-ring seal 46 provides a sealing between the sealing body 34 and the fiber tube 21. Finally, the fiber tube 21 is extending through a washer 33 for receiving axial force and the tube grounding element 27 which provides an electrical connection between the fiber tube 21 and the body of the termination assembly 11.

Figure 6:
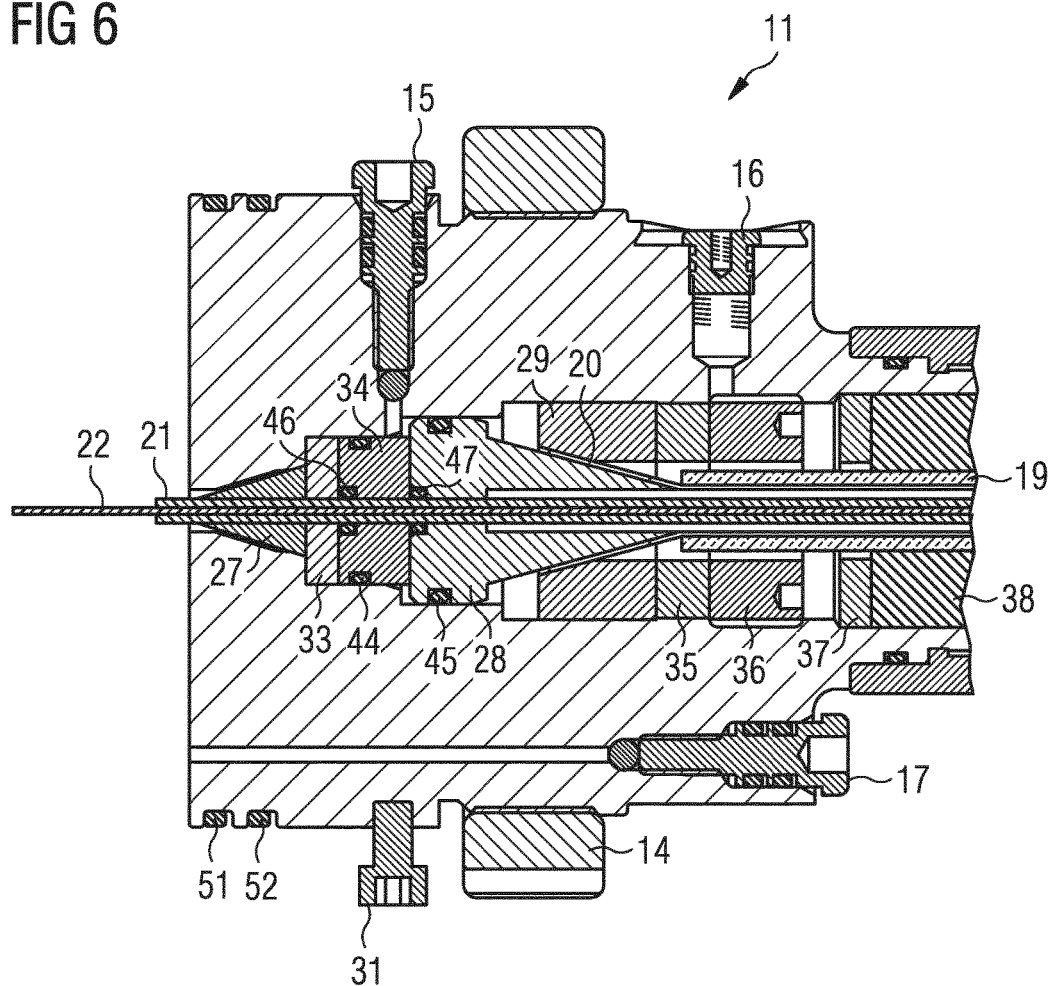
FIG. 6 shows an enlarged partial view of the sectional view of FIG. 2.

As can be seen from FIG. 6, there is a double seal comprising seals 46 and 47 for sealing a penetration of the fiber tube 21 into the chamber 26. A sealing structure comprising elements 33, 34, 28, 29, and 35 may be easily assembled and provides a fluid tight sealing when being compressed by the nut 36. Thus, no gluing or molding is required and therefore an assembly time may be reduced significantly. A sealed space between the seals 44 and 45 may be monitored via the umbilical sealed test port 15.

The assembled termination assembly 11 is finally mounted as a lid 24 at the corresponding side of the cylindrical housing 13. A double sealing between the body of the termination assembly 11 and the cylindrical housing 13 is provided by O-ring seals 51, 52 as shown in FIGS. 3 and 6.

The termination assembly 11 may be fixed to the cylindrical housing 13 by a set screw 31 and the locknut 14. A grounding cable may be coupled to the termination assembly 11 via a grounding screw 32.

The AFT Fiber Umbilical splice termination unit 10 is small and compact, and thus easy to be installed in the umbilical main splice. The main splice may house several splice termination units. The main advantage to the AFT Umbilical Splice is the short termination time. This important advantage is achieved by a relatively simple and safe design with no moldings which ensures a quick operation.

This splice termination unit 10 can be installed and tested in nominally 2 hours, reducing the down time for the installation by 10 hours. The technology behind the AFT Fiber Umbilical splice termination unit 10 makes use of advanced umbilical terminations. As an example, sealings may be used that correspond to the ones used on the Siemens Advanced Fiber Terminations (AFT) and Advanced Cable Terminations (ACT).

The embodiment of the splice termination unit 10 comprises a one-atmospheric chamber housing 13, and end lids 24 comprise the termination assemblies 11, 48, as can be seen in FIGS. 1, 2 and 3. This gives hermetical sealing for the one-atmospheric chamber 26, in which a close to atmospheric pressure prevails. The small size of the splice termination unit 10 is achieved by use of the advanced termination assemblies 11, 48 and the fiber management unit 30 as well as the splice 23 being located inside the chamber 26.

Splice termination unit 10 features:
Very short installation time, nominally 2 hours.
Designed for working depths down to 3000 m
Design lifetime: from 25 to 50 years
Test pressure: Up to 450 barg
Storage term temperature: −40° C. to +70° C.
Operation temperature: −4° C. to +25° C.
Single mode and multi mode fibers.

As can be seen in FIG. 3, the sealing of the termination assembly 11 comprises two O-ring seals 44, 45. A test port 15 can be arranged between these seals 44, 45 on the steel tube 21 to the umbilical. The one atmospheric chamber 26 has two test or fill ports 17 for leak test and flushing of the chamber 26 with nitrogen after assembly, to avoid water vapor from trapped air. Two cones 27, 28 holding the armoring 20 and tube 21 are securing the termination 10 to the umbilical 42.

The chamber 26 is formed between the insert 25 and the cylindrical housing 13. The end lids 24 are provided on both sides of the insert 25. The cylindrical housing 13 is slid over the insert 25 and sealed to the end lids by means of two O-ring seals 51, 52.

At the interface between the termination assembly 11, 48 and the chamber 26, penetrators may be provided that are capable of withstanding the differential pressures. These may be fiber optical penetrators having a glass to glass seal for leading one or more optical fibers into the chamber.

FIG. 4 shows a particular setting in which the splice termination unit 10 may be used. In particular, it may be used in a direct electrical heating (DEH) system. DEH uses single phase electrical current to heat the pipeline content above the hydrate formation temperature. The heating method is known as Direct Electric Heating (DEH) as the steel-built pipeline 20 (cable armor) is heated by forcing a single phase current directly through the pipe's steel mantle. The power is supplied through an umbilical, termed direct electrical heating cable 40 in FIG. 4.

Monitoring with fiber optic sensing provides continuous real time information about temperature and/or strain events along the length of the asset, helping to detect possible failures at the earliest stage, giving the operator time to take action.

Due to the high current in the respective umbilical, the cable termination should be connected to the grounding system of the umbilical. Embodiments of the splice termination unit 10 have a grounding system for both the armoring 20 in the umbilical 42 and the steel fiber tube 21 containing fiber 22. This is illustrated in FIGS. 2, 3 and showing tube grounding elements 27 and armor grounding elements 28, 29 in form of copper cones/a copper sleeve that provide such grounding to the umbilical armoring 20 and the steel tube 21 containing the optical fiber 22.

Figure 5:
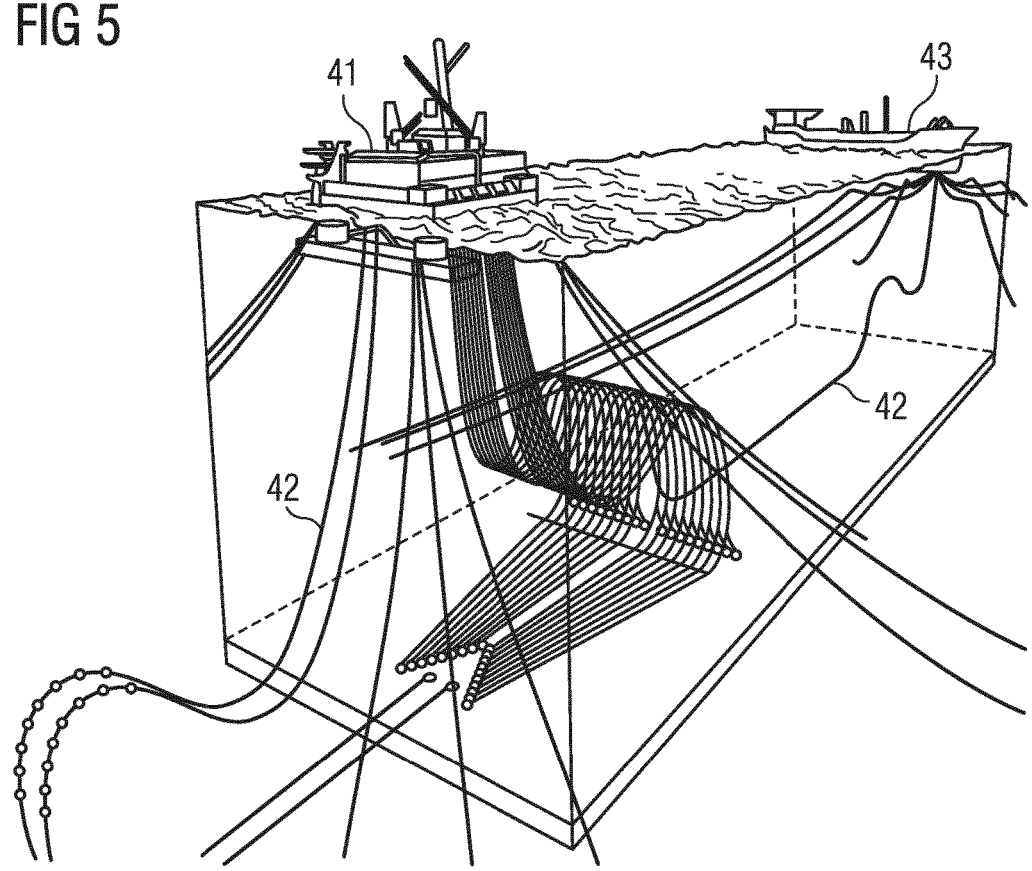
FIG. 5 is a schematic drawing showing an umbilical in which a splice termination unit according to an embodiment may be used.

FIG. 5 illustrates a further application of the splice termination unit 10 in the umbilical 42 that provides power and communication to a subsea installation. As can be seen, the umbilical 42 can reach from a floating vessel, such as a platform 41 or ship 43, to the ocean floor where it is connected to further units.

The following advantages may be achieved with the splice termination unit 10 according to embodiments and with the respective method:
Very Short Installation Time
Compact design to withstand rough handling and operational environment.
Grounding System for Use in DEH System It should be clear that the features of the embodiments can be combined with each other. Claims in this and in subsequent applications may also be aimed at individual features of the disclosed embodiments.

The invention claimed is:

1. A subsea splice termination unit for terminating and splicing two fiber optic cables, the subsea splice termination unit being configured for deployment in an underwater environment, the subsea splice termination unit comprising:
a subsea enclosure, a chamber being located inside the subsea enclosure;
a first termination assembly to terminate a first fiber optic cable, of the two fiber optic cables, at the subsea splice termination unit;
a second termination assembly to terminate a second fiber optic cable, of the two fiber optic cables, at the subsea splice termination unit;
a first penetrator leading at least a first optical fiber of the first fiber optic cable into the chamber; and
a second penetrator leading at least a second optical fiber of the second fiber optic cable into the chamber, a splice between the first optical fiber and the second optical fiber being arranged in the chamber, wherein at least one of first termination assembly and the second termination assembly includes a fiber optic penetrator for leading an optical fiber of the respective fiber optic cable into the chamber, the fiber optic penetrator providing sealing of the chamber, and wherein the fiber optic penetrator includes a glass to glass seal for sealing against the optical fiber.

2. The subsea splice termination unit of claim 1, wherein the subsea enclosure is configured to maintain a pressure below 5 bar inside the chamber.

3. The subsea splice termination unit of claim 1, further comprising a fiber management unit disposed inside the chamber.

4. The subsea splice termination unit of claim 1, wherein at least one of the first optical fiber and the second optical fiber is embedded in at least one of a corresponding first fiber tube and a second fiber tube, wherein at least one of the first penetrator and the second penetrator comprises a corresponding at least one of a first sealing body and a second sealing body providing a through-hole through which the corresponding at least one of the first fiber tube and second fiber tube extends, and wherein at least one seal, arranged within the through-hole, is configured to provide a fluid tight sealing of the corresponding at least one of the first fiber tube and second fiber tube within the corresponding at least one of a first sealing body and a second sealing body.

5. The subsea splice termination unit of claim 4, further comprising a seal at an outer circumferential surface of the corresponding at least one of a first sealing body and a second sealing body providing a fluid tight sealing of the corresponding at least one of a first sealing body and a second sealing body within the corresponding at least one of a first termination assembly and a second termination assembly.

6. The subsea splice termination unit of claim 1, wherein the subsea enclosure is configured to maintain a pressure inside the chamber below 10 bar.

7. The subsea splice termination unit of claim 6, wherein the chamber filled with a gas.

8. The subsea splice termination unit of claim 6, wherein the subsea enclosure is configured to allow deployment of the subsea splice termination unit in water depth of at least 2000 m.

9. The subsea splice termination unit of claim 1, wherein the subsea enclosure is configured to maintain a pressure between about 1 and about 2 bar inside the chamber.

10. The subsea splice termination unit of claim 1, wherein at least one of the first termination assembly and the second termination assembly is oil filled and pressure compensated.

11. The subsea splice termination unit of claim 1, wherein the subsea enclosure comprises a cylindrical housing including two end lids, wherein a first end lid of the two end lids includes the first termination assembly, and wherein a second end lid of the two end lids includes the second termination assembly.

12. The subsea splice termination unit of claim 1, wherein the subsea enclosure includes at least a fill port and a vent port for filling the chamber with a medium.

13. The subsea splice termination unit of claim 1, wherein at least one of the first termination assembly and the second termination assembly includes a retaining element for securing a cable armor of the respective fiber optic cable to the subsea splice termination unit, wherein the retaining element includes a cone and a sleeve with an inner tapered surface configured to receive the cone, and wherein the cable armor is clamped between the inner tapered surface of the sleeve and the cone.

14. The subsea splice termination unit of claim 13, wherein at least one of the first optical fiber and the second optical fiber is embedded in a corresponding one of a first fiber tube and a second fiber tube, wherein the cone provides a through-hole through which a corresponding one of the first fiber tube and the second fiber tube is configured to extend, and wherein at least one seal is arranged within the through-hole and to provide a fluid tight sealing of the corresponding fiber tube within the cone.

15. The subsea splice termination unit of claim 1, wherein the chamber is a pressure compensated chamber, and wherein internal pressure of the chamber is balanced to a pressure prevailing in an ambient environment when installed subsea.

16. The subsea splice termination unit of claim 15, wherein a internal pressure of the chamber is balanced to a pressure prevailing in the subsea environment when installed subsea.

17. The subsea splice termination unit of claim 1, wherein at least one of the first termination assembly and the second termination assembly includes a fiber tube grounding element to provide an electrical connection to a steel fiber tube of the respective fiber optic cable, the steel tube including the respective optical fiber, and wherein the fiber tube grounding element is provided by a metal cone.

18. The subsea splice termination unit of claim 1, wherein at least one of the first termination assembly and the second termination assembly includes an armor grounding element to provide an electrical connection to a cable armor of the respective fiber optic cable, and wherein the armor grounding element is provided by a metal sleeve, through which the cable armor is configured to pass.

19. The subsea splice termination unit of claim 1, wherein the subsea enclosure includes a cylindrical housing including an insert, the cylindrical housing being a cylindrical sleeve that is slidable in an axial direction into sealing engagement with the insert.

20. The subsea splice termination unit of claim 1, wherein the first fiber optic cable is part of a first section of a subsea umbilical, and wherein the second fiber optic cable is part of a second section of the subsea umbilical, and wherein the subsea splice termination unit is a subsea umbilical splice termination unit that forms part of an umbilical splice between the first section of the subsea umbilical and the second section of the subsea umbilical.

21. The subsea splice termination unit of claim 20, further comprising a fiber management unit disposed inside the chamber.

22. The subsea splice termination unit of claim 20, wherein at least one of the first optical fiber and the second optical fiber is embedded in at least one of a corresponding first fiber tube and a second fiber tube, wherein at least one of the first penetrator and the second penetrator comprises a corresponding at least one of a first sealing body and a second sealing body providing a through-hole through which the corresponding at least one of the first fiber tube and second fiber tube extends, and wherein at least one seal, arranged within the through-hole, is configured to provide a fluid tight sealing of the corresponding at least one of the first fiber tube and second fiber tube within the corresponding at least one of a first sealing body and a second sealing body.

23. The subsea splice termination unit of claim 22, further comprising a seal at an outer circumferential surface of the corresponding at least one of a first sealing body and a second sealing body providing a fluid tight sealing of the corresponding at least one of a first sealing body and a second sealing body within the corresponding at least one of a first termination assembly and a second termination assembly.

24. A subsea splice termination unit for terminating and splicing two fiber optic cables, the subsea splice termination unit being configured for deployment in an underwater environment, the subsea splice termination unit comprising:
 a subsea enclosure, a chamber being located inside the subsea enclosure;
 a first termination assembly to terminate a first fiber optic cable, of the two fiber optic cables, at the subsea splice termination unit;
 a second termination assembly to terminate a second fiber optic cable, of the two fiber optic cables, at the subsea splice termination unit;
 a first penetrator leading at least a first optical fiber of the first fiber optic cable into the chamber; and
 a second penetrator leading at least a second optical fiber of the second fiber optic cable into the chamber, a splice between the first optical fiber and the second optical fiber being arranged in the chamber, wherein at least one of the first termination assembly and the second termination assembly includes at least two seals and further includes a test port in flow communication with a space between the at least two seals for testing an integrity of at least one of the at least two seals.

25. The subsea splice termination unit of claim 24, wherein at least one of firsttermination assembly and the second termination assembly includes a fiber optic penetrator for leading an optical fiber of the respective fiber optic cable into the chamber, the fiber optic penetrator providing sealing of the chamber, and wherein the fiber optic penetrator includes a glass to glass seal for sealing against the optical fiber.

26. The subsea splice termination unit of claim 24, wherein the chamber is a pressure compensated chamber, and wherein internal pressure of the chamber is balanced to a pressure prevailing in an ambient environment when installed subsea.

27. A method of terminating and splicing a first fiber optic cable to a second fiber optic cable for allowing deployment of the splice in an underwater environment, the method comprising:

terminating the first fiber optic cable to a subsea splice termination unit and leading a first optical fiber of the first fiber optic cable into a chamber of the subsea splice termination unit;

terminating the second fiber optic cable to the subsea splice termination unit and leading a second optical fiber of the second optic cable into the chamber of the subsea splice termination unit;

splicing the first optical fiber and the second optical fiber to create a fiber splice;

arranging the fiber splice in the chamber and sealing the chamber with a subsea enclosure of the subsea splice termination unit: and filling the chamber with gas through a fill port provided in the subsea enclosure of the subsea splice termination unit.

28. The method according to claim 27, wherein the sealing of the chamber includes sliding a cylindrical housing of the subsea enclosure over and into sealing engagement with an insert of the subsea splice termination unit.

29. The method according to claim 27, wherein the gas is nitrogen.

30. The method according to claim 29, wherein the sealing of the chamber includes sliding a cylindrical housing of the subsea enclosure over and into sealing engagement with an insert of the subsea splice termination unit.

* * * * *